United States Patent
Hong et al.

(10) Patent No.: US 12,001,218 B2
(45) Date of Patent: Jun. 4, 2024

(54) MOBILE ROBOT DEVICE FOR CORRECTING POSITION BY FUSING IMAGE SENSOR AND PLURALITY OF GEOMAGNETIC SENSORS, AND CONTROL METHOD

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Soonhyuk Hong, Suwon-si (KR); Hyeon Myeong, Daejeon (KR); Hyongjin Kim, Daejeon (KR); Seungwon Song, Daejeon (KR); Jieum Hyun, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 797 days.

(21) Appl. No.: 17/055,415

(22) PCT Filed: Jun. 21, 2019

(86) PCT No.: PCT/KR2019/007499
§ 371 (c)(1),
(2) Date: Nov. 13, 2020

(87) PCT Pub. No.: WO2019/245320
PCT Pub. Date: Dec. 26, 2019

(65) Prior Publication Data
US 2021/0114204 A1    Apr. 22, 2021

Related U.S. Application Data

(60) Provisional application No. 62/688,700, filed on Jun. 22, 2018.

(30) Foreign Application Priority Data

Feb. 28, 2019 (KR) .................. 10-2019-0024283

(51) Int. Cl.
*B25J 9/16* (2006.01)
*G05D 1/00* (2006.01)
(Continued)

(52) U.S. Cl.
CPC ............ *G05D 1/0246* (2013.01); *B25J 9/162* (2013.01); *G06F 16/9024* (2019.01); *G06V 10/803* (2022.01); *G06V 20/10* (2022.01)

(58) Field of Classification Search
CPC .. G05D 1/0246; G05D 1/0261; G05D 1/0272; B25J 9/162; B25J 9/1692;
(Continued)

(56) References Cited

U.S. PATENT DOCUMENTS 7,725,253 B2    5/2010    Foxlin
9,164,509 B2    10/2015   Kim et al.
(Continued)

FOREIGN PATENT DOCUMENTS

CN    103674015 A       3/2014
CN    103278170 B   *   1/2016
(Continued)

OTHER PUBLICATIONS

Hyungjin Kim et al., "RGB-D and Magnetic Sequence-based Graph SLAM Application with Kidnap Recovery", 2018 18th International Conference on Control, Automation and Systems (ICCAS 2018), Oct. 17-20, 2018, 4 pages total.
(Continued)

*Primary Examiner* — Adam R Mott
*Assistant Examiner* — Sagar Kc
(74) *Attorney, Agent, or Firm* — Sughrue Mion, PLLC

(57) ABSTRACT

Provided are a mobile robot device and a control method thereof. The mobile robot device comprises: a driving unit;
(Continued)

an image sensor; a plurality of geomagnetic sensors; a memory for storing at least one instruction; and a processor for executing at least one instruction, wherein the processor may obtain, while the mobile robot device moves by means of the driving unit, a plurality of image data through the image sensor and obtain sensing data through the plurality of geomagnetic sensors, extract a feature point from the plurality of image data and obtain key nodes on the basis of the feature point, obtain a node sequence on the basis of the sensing data, generate a graph structure that estimates a position of the mobile robot device on the basis of the key nodes and the node sequence, and correct the graph structure based on the mobile failing in position recognition.

12 Claims, 21 Drawing Sheets

(51) Int. Cl.
  *G06F 16/901* (2019.01)
  *G06V 10/80* (2022.01)
  *G06V 20/10* (2022.01)
(58) Field of Classification Search
  CPC ........ B25J 9/161; B25J 9/1664; B25J 9/1697; B25J 11/00; B25J 9/16; G06F 16/9024; G06F 18/251; G06V 10/803; G06V 20/10
  See application file for complete search history.

(56) References Cited

U.S. PATENT DOCUMENTS

| | | | |
|---|---|---|---|
| 9,224,043 B2 | 12/2015 | Hasegawa et al. | |
| 10,347,001 B2* | 7/2019 | Murphy-Chutorian | ..................... G06V 10/82 |
| 10,852,729 B2* | 12/2020 | Choi | ................... G05D 1/0274 |
| 10,949,798 B2* | 3/2021 | Kingsford | .............. G06V 20/64 |
| 2011/0125323 A1* | 5/2011 | Gutmann | ............... B25J 9/1664 700/258 |
| 2011/0182476 A1* | 7/2011 | Kim | ......................... G06T 7/85 382/106 |
| 2013/0166137 A1* | 6/2013 | Ahn | ...................... G05D 1/027 701/32.3 |
| 2014/0244094 A1 | 8/2014 | Kim et al. | |
| 2016/0062361 A1* | 3/2016 | Nakano | .................. G05D 1/024 701/25 |
| 2016/0377688 A1 | 12/2016 | Kleiner et al. | |
| 2017/0003131 A1 | 1/2017 | Myeong et al. | |
| 2017/0024877 A1* | 1/2017 | Versace | ..................... G01S 5/16 |
| 2018/0079085 A1 | 3/2018 | Nakata et al. | |

FOREIGN PATENT DOCUMENTS

| | | | |
|---|---|---|---|
| EP | 3 252 714 A1 | | 12/2017 |
| EP | 3 367 199 B1 | | 5/2020 |
| JP | 2012-64131 A | | 3/2012 |
| JP | 2017-45447 A | | 3/2017 |
| KR | 10-0801261 B1 | | 2/2008 |
| KR | 10-2014-0108821 A | | 9/2014 |
| KR | 10-2014-0110586 A | | 9/2014 |
| KR | 10-2016-0147179 A | | 12/2016 |
| KR | 10-2016-0150504 A | | 12/2016 |
| KR | 20160150504 A | * | 12/2016 |
| KR | 10-2017-0004556 A | | 1/2017 |
| KR | 10-2017-0061373 A | | 6/2017 |

OTHER PUBLICATIONS

International Search Report dated Oct. 16, 2019 issued by the International Searching Authority in counterpart International Application No. PCT/KR2019/007499 (PCT/ISA/210).
International Written Opinion dated Oct. 16, 2019 issued by the International Searching Authority in counterpart International Application No. PCT/KR2019/007499 (PCT/ISA/237).
Communication dated Jul. 24, 2023 by the Korean Intellectual Property Office in counterpart Korean Patent Application No. 10-2019-0024283.
Communication dated Oct. 12, 2023 by the Korean Intellectual Property Office in counterpart Korean Patent Application No. 10-2019-0024283.

* cited by examiner

FIG. 9B

| | UNMEASURABLE RANGE | MEASURABLE RANGE |
|---|---|---|
| QUERY BUNDLE POSITIONED AT LEFT SIDE | | |
| QUERY BUNDLE POSITIONED AT RIGHT SIDE | | |

MOBILE ROBOT DEVICE FOR CORRECTING POSITION BY FUSING IMAGE SENSOR AND PLURALITY OF GEOMAGNETIC SENSORS, AND CONTROL METHOD

TECHNICAL FIELD

The disclosure relates to a mobile robot device which corrects position by combining an image sensor and a plurality of geomagnetic sensors and produces a map and a control method thereof. More specifically, the disclosure relates to a device which estimates and corrects a current position of a mobile robot by analyzing and simultaneously matching data obtained through each sensor and a control method thereof.

BACKGROUND ART

Robots have been enhancing work efficiency by performing jobs difficult for humans to approach in a variety of industries. In industries related to manufacturing, a robot arm form fixed at a specific position and performing repetitive work has been utilized, but research on and demand for mobile robot devices capable of relatively free movement and performing various jobs are gradually increasing.

However, the mobile robot devices, in order to move, need to identify which location its current position is at and at the same time construct a route, that is a map, by recognizing its surrounding environment. A technology that achieves the above two process simultaneously is referred to as a Simultaneous Localization And Mapping (SLAM) technique.

The above-described SLAM technique has recently undergone development into various fields, and is receiving special attention as a technique essential for effectively driving robot cleaners, autonomous vehicles, or the like. Further, as a type of the above-described SLAM, a graph-based SLAM which represents a position of a robot and odometry as a node and edge (or, constraint) is widely being used.

A 2-dimensional (2D) or a 3-dimensional (3D) Light Detection And Ranging (LiDAR) has generally been used to realize a graph SLAM according to prior art, but to date, using the above in a typical robot has been ineffective in terms of competitiveness from a cost aspect.

In addition, in the case of a graph SLAM which utilized a camera according to prior art, disadvantages such as an effective position recognition being difficult in an environment such as an empty hallway with not many feature points and not being robust due to being affected by amount of light may be present.

In addition, a method of utilizing a beacon, Wi-Fi, or the like in doors according to prior art has the limitation of having to install a separate beacon or the limitation that all communication needs to be smooth in an indoor space.

Further, a technology that recognizes the position through geomagnetic sensors according to prior art has the limitation of matching not being accurate in an environment where distortion in magnetic field is not sufficiently large enough, and even if the technology was utilized, other supplementary means were required because only similarity between the positions may be known.

Accordingly, a technique for effectively configuring a sensor and processing data is necessary for applying graph SLAM technique to a mobile robot device, and there is a need to discover a method for using the features comprised in each sensor and supplementing the functions of one another.

DISCLOSURE

Technical Problem

The disclosure provides a mobile robot device which fuses an image sensor and a plurality of geomagnetic sensors with different features from one another to cause the mobile robot device to more effectively use graph SLAM technique and a control method thereof.

Technical Solution

According to an embodiment, a mobile robot device includes a driving unit; an image sensor; a plurality of sensors; a memory storing at least one instruction; and a processor configured to execute the at least one instruction, and the processor is configured to obtain a plurality of image data through the image sensor while the mobile robot device moves through the driving unit, obtain sensing data through the plurality of geomagnetic sensors, extract a feature point from the plurality of image data and obtain key nodes based on the feature point, obtain a node sequence based on the sensing data, generate a graph structure estimating a position of the mobile robot device based on the key nodes and the node sequence, and correct the graph structure based on a position recognition of the mobile robot device failing.

The processor may be configured to control for the feature points to be extracted by using an Oriented FAST and Rotated BRIEF (ORB) algorithm in the plurality of image data.

The processor may be configured to form a submap by accumulating the feature points, and obtain the key node by matching with a most proximate node by performing a Random Sample Consensus (RANSAC) algorithm on the submap.

The processor may be configured to obtain a sensing data group by grouping the obtained sensing data, perform matching by comparing a magnetic field value of the sensing data group with magnetic field values of the previously stored sensing data group, and obtain a node bundle comprised of a pair of graphs structures based on the matched sensing data group.

The processor may be configured to identify whether or not the newly obtained node bundle is present between the previously stored node bundle, and based on the newly obtained node bundle being identified as present between the previously stored node bundle, extract only the newly obtained node bundle present between the previously obtained node bundle, and select only the extracted newly obtained node bundle as the node sequence.

The processor may be configured to update the previously obtained node bundle with a smaller distance difference with the extracted newly obtained node bundle, search for a node bundle with the smallest distance difference from among the extracted newly obtained node bundle and the updated previously obtained node bundle, and locate a position of the node sequence by using the node bundle with smallest distance difference.

The processor may be configured to update to a previously obtained node bundle with a smaller distance difference by using a Gaussian process.

The processor may be configured to, based on failing in position recognition by detecting position information different from position information represented in the graph structure generated by the mobile robot device through a wheel sensor while the mobile robot device is moving, obtain a new image data and sensing data through the image sensor and the plurality of geomagnetic sensors as the mobile robot device rotates.

The processor may be configured to obtain a new key node and a node sequence based on the image data and the sensing data newly obtained by the mobile robot device, and identify whether or not matching occurs by comparing with the previously generated graph structure based on the obtained new key node and the node sequence.

The processor may be configured to correct the graph structure based on the new key node and the node sequence which matches with the previously generated graph structure.

According to an embodiment, a control method of a mobile robot device includes obtaining a plurality of image data through an image sensor while the mobile robot device is moving and obtaining sensing data through a plurality of geomagnetic sensors, extracting a feature point from the plurality of image data and obtaining key nodes based on the feature point, obtaining a node sequence based on the sensing data, generating a graph structure which estimates a position of the mobile robot device based on the key nodes and the node sequence, and correcting the graph structure based on the mobile robot device failing in position recognition.

The obtaining the key nodes may include extracting the feature points by using an Oriented FAST and Rotated BRIEF (ORB) algorithm in the plurality of image data.

The obtaining the key nodes may include forming a submap by accumulating the feature points, and performing a Random Sample Consensus (RANSAC) algorithm on the submap and obtaining the key node by matching with a most proximate node.

The obtaining the node sequence may include obtaining a sensing data group by grouping the obtained sensing data, matching by comparing a magnetic field value of the sensing data group with magnetic field values of a previously stored sensing data group, and obtaining a node bundle comprised of a pair of graph structures based on the matched sensing data group.

The obtaining the node sequence may include identifying whether or not the newly obtained node bundle is present between the previously stored node bundle, and based on identifying that the newly obtained node bundle is present between the previously stored node bundle, extracting only the newly obtained node bundle that is present between the previously obtained node bundle, and selecting only the extracted newly obtained node bundle as the node sequence.

The locating a position of the node sequence may include updating the previous obtained node bundle with a smaller distance difference with the extracted newly obtained node bundle, searching for the node bundle with the smallest distance difference from among the extracted newly obtained node bundle and the updated previously obtained node bundle, and locating a position of the node sequence by using the node bundle with the smallest distance difference.

The locating a position of the node sequence may include updating with the previously obtained node bundle with the smaller distance difference by using a Gaussian process.

The correcting the graph structure may include, based on failing in position recognition by detecting position information different from position information represented in the graph structure generated by the mobile robot device through a wheel sensor while the mobile robot device is moving, obtaining a new image data and sensing data through the image sensor and the plurality of geomagnetic sensors as the mobile robot device rotates.

The correcting the graph structure may include obtaining a new key node and a node sequence based on the image data and the sensing data newly obtained by the mobile robot device, and identifying whether or not matching occurs by comparing with the previously generated graph structure based on the obtained new key node and the node sequence.

The correcting the graph structure may include correcting the graph structure based on the new key node and the node sequence matching with the previously generated graph structure.

Effect of Invention

According to the various embodiments, the mobile robot device may generate a graph structure based on position information by matching and fusing each of the data obtained from the image sensor and the plurality of geomagnetic sensors, and based on the mobile robot device failing in position recognition, may be able to correct the graph.

DESCRIPTION OF DRAWINGS

FIG. 9B is a diagram illustrating a table identifying whether or not a distance value of a previously obtained node bundle and a newly obtained node bundle may be measured according to an embodiment of the disclosure;

DETAILED DESCRIPTION OF EXEMPLARY EMBODIMENTS

Embodiments described herein are merely example embodiments to assist in the understanding of the disclosure, and it is to be understood that the disclosure may be variously modified and implemented different from the example embodiments described herein. Meanwhile, in describing embodiments, in case it is determined that the detailed description on related known function or element may unnecessarily confuse the gist of the disclosure, the detailed description will be omitted. In addition, to assist in the understanding of the disclosure, the attached drawings may be illustrated in a manner in which measurements of some elements are excessively illustrated not illustrated according to their actual scale.

In describing the disclosure, it is to be understood that an order of each step is non-limiting unless a preceding step must be performed logically and temporally prior to a following step. That is, except for exceptional cases such as the above, even if a step described as the following step is performed prior to a step described as the prior step, it does not affect the nature of the disclosure and the scope of protection may also be defined regardless of the order of the steps.

Further, in the disclosure, the expression described as "A or B" is to be defined as not only selectively indicating any one of A and B, but also including both A and B. In addition, the term "comprising" or "including" used herein may refer to a comprehensive meaning of further including another element in addition to the listed elements.

In the disclosure, elements necessary in describing each embodiment have been described, but the embodiment is not necessarily limited thereto. Accordingly, some elements may be modified or omitted, and other elements may also be added. In addition, the elements may be dispersed and disposed in independent devices different from one another.

Figure 1:
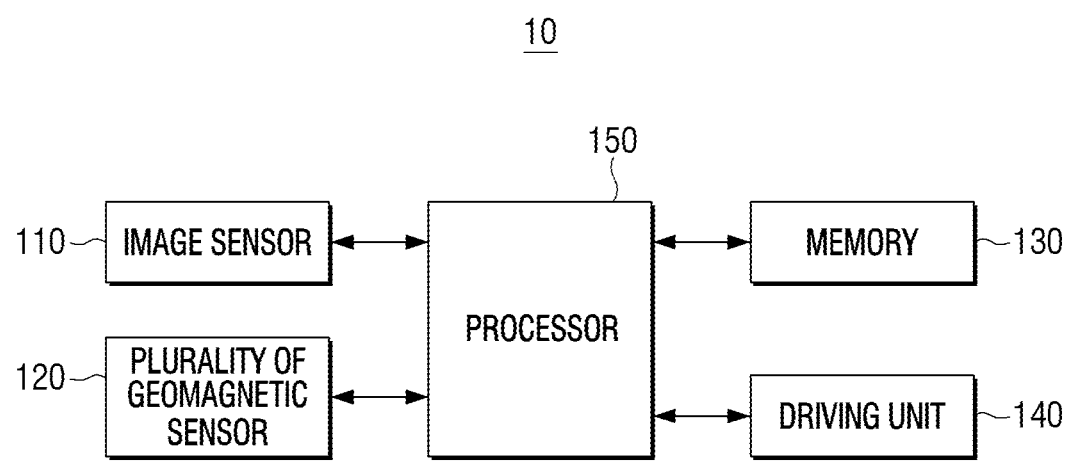
FIG. 1 is a block diagram illustrating a brief configuration of a mobile robot device according to an embodiment of the disclosure.

The disclosure will be described in greater detail below with reference to the accompanying drawings. FIG. 1 is a block diagram illustrating a brief configuration of a mobile robot device 10 according to an embodiment of the disclosure.

As illustrated in FIG. 1, the mobile robot device 10 may include a processor 150, an image sensor 110, a plurality of geomagnetic sensor 120, a memory 130, and a driving unit 140.

A 3-dimensional image data including a color image and a depth image may be obtained by using the image sensor 110, and a distance value corresponding to the pixel of the obtained 3-dimensional image data may be measured. The image sensor 110 may then include a stereo camera, a Time of Flight (ToF) camera, an infrared camera, and the like, and obtain a depth data value of each pixel. The image sensor 110 may even operate in various situations such as the mobile robot device 10 moving, rotating, and stopping.

The plurality of geomagnetic sensors 120 may be an Inertial Measurement Unit (IMU) with a 3-axis geomagnetic sensor embedded. A magnetic field sensing data may be obtained through the plurality of geomagnetic sensors 120. The sensing data obtained through the plurality of geomagnetic sensors 120 may be stored in the memory 130.

The memory 130 may store instructions or data related to at least one other element of the mobile robot device 10. Specifically, the memory 130 may be implemented as a non-volatile memory, a volatile memory, a flash-memory, a hard disk drive (HDD), a solid state drive (SSD), or the like. The memory 130 may be accessed by the processor 150, and the reading/recording/modifying/updating and the like of data may be performed by the processor 150. The term memory in the disclosure may include a memory 130, a read only memory (ROM, not shown) within the processor 150, a random access memory (RAM, not shown), or a memory card (not shown, e.g., micro SD card, memory stick) mounted to the mobile robot device 10. In addition, the memory 130 may be stored with programs for configuring various screens to be displayed in a display area of the display and data and the like.

The memory 130 may be stored with the obtained 3-dimensional image data or sensing data, and may store at least one instruction. Various program instructions may be included, but the various program instructions may be partially omitted, modified, or added according to the type and characteristic of the mobile robot device 10.

The driving unit 140 may be a device which assists the mobile robot device to move, may be comprised of wheels, and may be comprised of devices capable of movement in a non-standard movement form such as a N-legged walk or the like. The driving unit 140 may be configured to not only move backward and forward but also turn left and right, and may also be configured to spin. Accordingly, the driving unit 140 may be variously comprised according to the type and characteristic of the mobile robot device 10.

The processor 150 may control the overall operation of the mobile robot device 10 by using various instructions, modules, and the like stored in the memory 130.

Specifically, while the mobile robot device 10 is moving through the driving unit 140, the processor 150 may obtain the plurality of image data through the image sensor 110, and obtain the sensing data through the plurality of geomagnetic sensors 120.

The processor 150 may extract a feature point from a plurality of image data and obtain key nodes based on the feature point. Specifically, the processor 150 may extract feature points by using an Oriented FAST and Rotated BRIEF (ORB) algorithm in the plurality of image data. The processor 150 may then form a submap by accumulating the extracted feature points, perform a Random sample consensus (RANSAC) algorithm on the submap, and obtain a key node by matching with the most proximate node.

In addition, the processor 150 may obtain a node sequence based on the sensing data. Specifically, the graph structure estimating a position of the mobile robot device 10 based on the key nodes and the node sequence may be generated, and the graph structure may be corrected based on the mobile robot device 10 failing in position recognition.

The processor 150 may obtain a sensing data group by grouping the obtained sensing data, perform matching by comparing a magnetic field value of the obtained sensing data group and the magnetic field values of the previously stored sensing data group, and obtain a node bundle comprised of a pair of graph structures based on the matched sensing data group.

In addition, the processor 150 may identify whether or not the newly obtained node bundle is present between the previously stored node bundle, and based on identifying that the newly obtained node bundle is present between the previously stored node bundle, extract only the newly obtained node bundle present between the previously obtained node bundle and select only the extracted newly obtained node bundle as the node sequence.

Then, the processor 150 may update the previously obtained node bundle with the smaller distance difference with the extracted newly obtained node bundle, search for the node bundle with the smallest distance difference from among the extracted newly obtained node bundle and the updated previously obtained node bundle, and locate a position of the node sequence by using the node bundle with the smallest distance difference.

In addition, the processor 150 may update to the previously obtained node bundle with the smaller distance difference by using a Gaussian process.

The processor 150 may, based on failing in position recognition by detecting position information different from position information represented in the graph structure generated by the mobile robot device 10 through the wheel sensor 160 while the mobile robot device 10 is moving, obtain a new image data and sensing data through the image sensor 110 and the plurality of geomagnetic sensors as the mobile robot device 10 rotates.

In addition, the processor 150 may obtain a new key node and a node sequence based on the image data and the sensing data newly obtained by the mobile robot device 10, and identify whether or not matching occurs by comparing with the previously generated graph structure based on the obtained new key node and the node sequence.

The processor 150 may then correct the graph structure based on the new key node and the node sequence matching with the previously generated graph structure.

Figure 2:
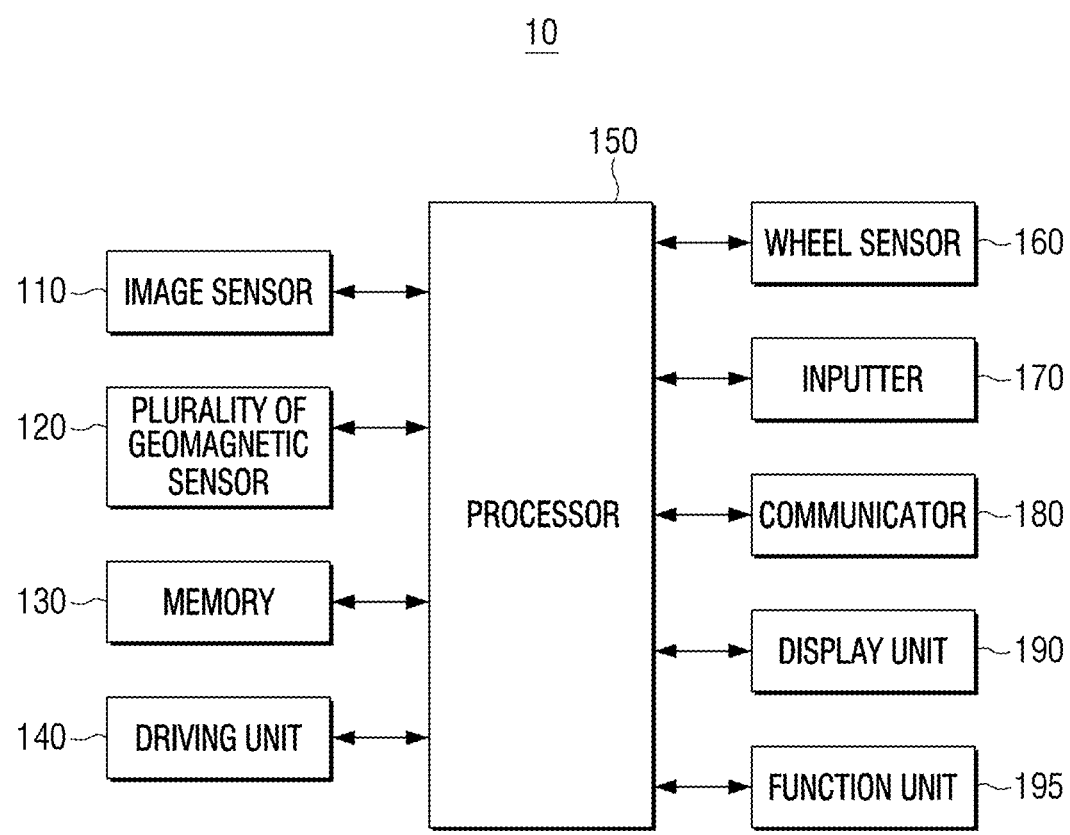
FIG. 2 is a block diagram illustrating a detailed configuration of a mobile robot device according to an embodiment of the disclosure.

FIG. 2 is a block diagram illustrating a detailed configuration of the mobile robot device 10 according to an embodiment of the disclosure. As illustrated in FIG. 2, the mobile robot device 10 may include a processor 150, an image sensor 110, a plurality of geomagnetic sensors 120, a wheel sensor 160, an inputter 170, a memory 130, a driving unit 140, a communicator 180, a display unit 190, and a function unit 195.

Because the image sensor 110, the plurality of geomagnetic sensor 120, the memory 130, the driving unit 140, and the processor 150 illustrated in FIG. 2 has been described in FIG. 1, overlapping descriptions thereof will be omitted.

FIG. 2 comprehensively illustrates various elements by providing an example of the mobile robot device 10 being a device included with various functions such as content sharing function, communication function, display function, or the like. Accordingly, some from among the elements illustrated in FIG. 2 may be omitted or modified, or another element may be further added based on the embodiment.

The number of image sensor 110 may be in plurality, and the image sensor may be disposed at a center part, an outer part, or the like of the mobile robot device 10 and photograph the surrounding environment. However, this is merely one embodiment, and the number of image sensors 110 may be added or modified, or the position may be changed according to the type and characteristic of the mobile robot device 10.

The plurality of geomagnetic sensors 120 may measure distortions in magnetic field in an indoor environment, and may extract magnetic field features, or the like by using a sequence. The plurality of geomagnetic sensors 120 may also operate regardless of the operating situation of the mobile robot device 10.

The plurality of geomagnetic sensors 120 may then be disposed symmetrically at left and right side of the driving unit 140 of the mobile robot device 10, but this is merely one embodiment, and may be disposed to various positions. The number of the plurality of geomagnetic sensors 120 may be added or modified, or the position may be changed according to the type and characteristic of the mobile robot device 10.

The wheel sensor 160 may, in an embodiment, detect a situation in which the wheel of the mobile robot device 10 is not in contact with the floor and is floating, that is, a kidnapping situation. The wheel sensor 160 may not only detect a kidnapping situation, but also a situation of failing in position recognition that detects position information different from the graph structure which represents position information of the mobile robot device 10 obtained by the mobile robot device 10. The wheel sensor 160 may be disposed in the driving unit 140 which contacts the floor, but this is merely one embodiment and may be disposed anywhere that contacts the floor.

The inputter 170 may receive a user command for controlling the overall operation of the mobile robot device 10. The inputter 170 may be implemented as a touch screen, but this is merely one embodiment, and may be implemented as another input device (e.g., mouse, keyboard, microphone) according to the type and characteristic of the mobile robot device 10.

The driving unit 140 may be configured so that the mobile robot device 10 is able to move freely such as including moving backward and forward, rotating, or the like. As described above, the wheel sensor 160 may be disposed in the driving unit 140. The driving unit 140 may be variously modified such as a four-legged walk, or the like according to the type and characteristic of the mobile robot device 10.

The communicator 180 may be a configuration capable of performing communication with external devices of various types based on the communication methods of various types.

The communicator 180 may include a variety of communication chips such as, for example, and without limitation, a Wi-Fi chip, a Bluetooth chip, a wireless communication chip, or the like. The Wi-Fi chip and the Bluetooth chip may each perform communication through a Wi-Fi method and a Bluetooth method. The wireless communication chip may refer to a chip which performs communication according to various communication standards such as IEEE, ZigBee, 3rd generation (3G), 3rd generation partnership project (3GPP), long term evolution (LTE), or the like.

The display unit 190 may output image data by control of the processor 150. Specifically, the display unit may display content or the like received through the communicator 180, and based on the mobile robot device 10 generating a graph structure based on the obtained data, the display unit may estimate a moving route of the mobile robot device 10 by displaying the corresponding graph. However, this is merely one embodiment, and the display unit may display various functions suitable to the type and characteristic of the mobile robot device 10.

The function unit 195 may perform various functions according to the type and characteristic of the mobile robot device 10. For example, if the mobile robot device 10 is a robot cleaner, the robot cleaner may absorb dust present in the surroundings through the function unit 195 while moving. Further, if the mobile robot device 10 is a robot which moves while playing various multimedia content, the function unit 195 may be a hardware playing back the multimedia content.

The processor 150 may include one or more from among a central processing unit (CPU), a micro controller unit (MCU), a micro processing unit (MPU), a controller, an application processor (AP), a communication processor (CP), or an ARM processor which processes a digital signal, or may be defined by the corresponding term. In addition, the processor 150 may be implemented as a System on Chip (SoC) or large scale integration embedded with a processing algorithm, and may be implemented in a form of a field programmable gate array (FPGA). The processor 150 may perform various functions by executing computer executable instructions stored in the memory 130. In addition thereto, the processor 150 may include at least one from among a graphics-processing unit (GPU), a neural processing unit (NPU), or a visual processing unit (VPU), which are separate AI dedicated processors to perform an artificial intelligence function.

Figure 3:
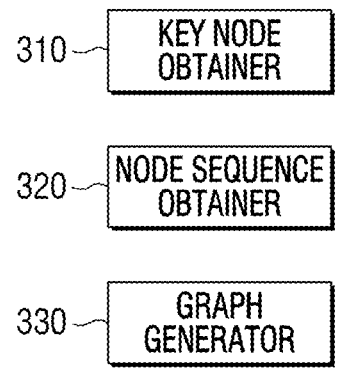
FIG. 3 is a block diagram illustrating a configuration generating a graph by obtaining a key node and a node sequence according to an embodiment of the disclosure.

FIG. 3 is a block diagram illustrating a configuration generating a graph by obtaining a key node and a node sequence according to an embodiment of the disclosure.

The processor 150 may include a key node obtainer 310, a node sequence obtainer 320, and a graph generator 330 illustrated in FIG. 3.

The key node obtainer 310 may obtain the key node by extracting and matching the feature point by using the image data obtained in the image sensor 110 which is stored in the memory 130. The image data may be a 3-dimensional data including color data and depth data and may extract the feature point by using an Oriented FAST and Rotated BRIEF (ORB) algorithm. The Oriented FAST and Rotated BRIEF (ORB) algorithm is merely one embodiment, and the feature point may also be extracted from the 3-dimensional image data by using other algorithms (e.g., algorithms such as the speeded up robust features (SURF) and the Scale Invariant Feature Transform (SIFT)).

The key node obtainer 310 may overcome an environment lacking of feature points using the method of forming a submap by accumulating the extracted feature points. The submap may be comprised of 3-dimensional feature points accumulating in the key node obtainer 310, and a credibility of odometry of a robot may be established.

In an embodiment, the key node obtainer 310 may, based on the wheel sensor 160 detecting a situation of failing in position recognition, such as kidnapping of the mobile robot device, obtain the key node by utilizing the 3-dimensional image data obtained from the image sensor 110 even in a new environment.

The node sequence obtainer 320 may obtain the node sequence based on the sensing data obtained through the plurality of geomagnetic sensors 120 stored in the memory 130. The sensing data may include data to which distortions in magnetic field of the indoor environment is reflected. Data which measures distortion in magnetic field such as sensing data may not just be a value of a specific moment and may derive the magnetic field value or the like by using the sequence of various data.

Accordingly, the node sequence obtainer 320 may perform grouping of the sensing data, perform matching of the magnetic field value of the grouped sensing data, and generate a node bundle with the matched sensing data group. Then, a node sequence of a loop closing form may be obtained by matching the node bundle again. The loop closing form may refer to a closed circuit form, and the node being connected in the form of a sequence.

Then, a Gaussian process may be applied in the process of obtaining the node sequence by performing the node bundle matching in the node sequence obtainer 320. The Gaussian process may, as a type of supervised learning, be a set of random variables. At this time, the set variables may follow a Joint Gaussian distribution. The embodiment will be described in greater detail with reference to FIG. 10.

In addition, the query with the smallest error score may be extracted by comparing the query value which is the newly obtained node bundle with the previously obtained node bundle (target) in the node sequence obtainer 320. The node bundle with the smallest distance difference as described above may be selected as the node sequence in a loop closing form.

The graph generator 330 may generate a graph structure representing the position information of the mobile robot device 10 based on the key node and the node sequence obtained from the key node obtainer 310 and the node sequence obtainer 320.

Then, the graph structure generated by the graph generator 330 may be in a loop closing form, and may be comprised of the key node and the node sequence. The above-described graph structure may indicate that each of the 3-dimensional image data matching and the sensing data matching may be carried out simultaneously.

In addition, the graph generator 330 may, in not only a kidnapping situation which is a situation in which the mobile robot device 10 is currently in a floating state but also in a situation of failing in various position recognition, correct the graph based on the data obtained from the image sensor 110 and the plurality of geomagnetic sensors 120 by the wheel sensor 160.

In an embodiment, the graph structure generated in the graph generator 330 may be displayed in the display unit 190, and based on performing a predetermined event in the inputter 170 (e.g., touch screen, microphone, keyboard, etc.), a simulation process may be viewed in the display unit 190.

Figure 4:
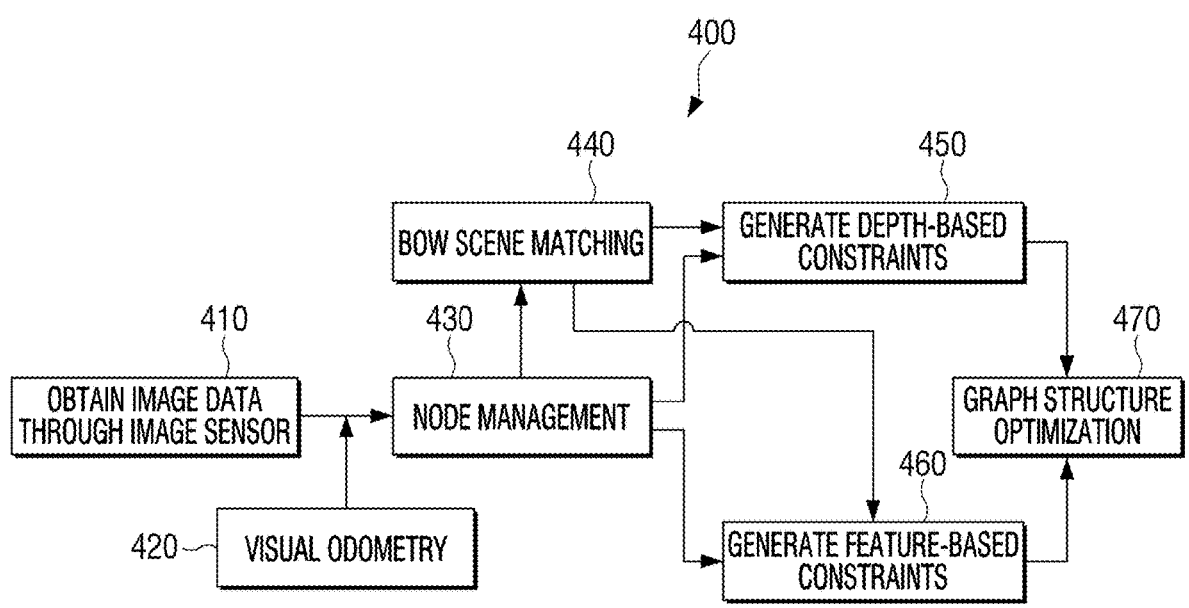
FIG. 4 is a block diagram illustrating a graph SLAM algorithm using an image sensor according to an embodiment of the disclosure.

FIG. 4 is a block diagram illustrating a graph SLAM algorithm using an image sensor 110 according to an embodiment of the disclosure.

That is, FIG. 4 illustrates a process 400 of obtaining a key node based on the 3-dimensional image data obtained in the image sensor 110, and estimating a position information of the mobile robot device 10 and producing a map by generating a graph structure based on the obtained key node.

The 3-dimensional image data included with depth data may be obtained through the image sensor 110 which is an element of the mobile robot device 10 (410). According to an embodiment, a continuous or non-continuous 3-dimensional image data may be obtained through the image sensor 110, the obtained 3-dimensional image data may be stored in the memory 130.

The mobile robot device 10 may, by using the 3-dimensional image data obtained through the image sensor 110, perform a visual odometry 420 process. The visual odometry 420 process may refer to a process of identifying a position and direction of the mobile robot device 10 by analyzing image data obtained by the mobile robot device 10. The mobile robot device 10 may use visual odometry 420 which may be effectively used even in a mobile robot device 10 with a non-standard movement method such as an N-legged walking robot, but this is merely one embodiment.

In an embodiment, the visual odometry 420 process which is performed by the mobile robot device 10 may go through an image correction operation with respect to the 3-dimensional image data obtained beforehand. Specifically, the mobile robot device 10 may correct matters such as lens distortion which may occur in the process of obtaining 3-dimensional image data by the image sensor 110. The mobile robot device 10 may extract the feature point of the 3-dimensional image data which completed image correction, and construct an optical flow field with the extracted feature point. The mobile robot device 10 may identify the position and direction of the mobile robot device 10 through the optical flow vector of the optical flow field.

In an embodiment, the mobile robot device 10 may extract the feature point by using the Oriented FAST and Rotated BRIEF (ORB) algorithm in the 3-dimensional image data. The Oriented FAST and Rotated BRIEF (ORB) algorithm may identify 16-pixel values on a circle with a radius of 3 based on a specified point on the 3-dimensional image frame, and extract the feature point by using a FAST-9 algorithm which selects a corner for the feature point based on pixels which are brighter or darker than the specified point by a predetermined value or more being consecutive by 9 or more pixels. However, this is merely one embodiment, and the number of brighter or darker pixels which are consecutive while using the Oriented FAST and Rotated BRIEF (ORB) algorithm may be changed according to the characteristic of the mobile robot device 10.

The mobile robot device 10 may perform matching by accumulating the feature points extracted from the obtained 3-dimensional image data, and the above-described process may be referred to as anode management 430. Specifically, the mobile robot device 10 may perform matching of the submap accumulated by gathering the feature points for each pose, that is node, of the mobile robot device 10.

$$M_{S_j} = \sum_{i=k \in s_j}^{l \in s_j} X_0^{-1} X_i T_C^R P_i \quad (1)$$

Here, equation (1) above may be an equation for describing the processor 150 being able to form a submap by accumulating the feature point extracted from the 3-dimensional image data. The M on the left side denotes a j-th submap which accumulated the feature points. The $X_o^{-1}$ on the right side denotes a constant number, $X_i$ denotes odometry of an i-th mobile robot device 10, $T_C^r$ denotes a coordinate transformation from the image sensor 110 to the mobile robot device 10, $P_i$ denotes a pose of an i-th robot, that is the feature point of an i-th node. K and l denote an index number of the first and last node included in the j-th submap.

The mobile robot device 10 may perform matching of the submap formed by accumulating the feature points in two steps. The first step may be a step searching the submap most proximate with the target node by matching the several submaps and the target node by the mobile robot device 10. The mobile robot device 10 may, because estimating a position of the mobile robot device 10 is difficult by performing matching on a one feature point basis in an environment in which lacks feature points, view the entire submap with the feature points accumulated as one submap and perform rough matching with the most proximate node, that is the target node.

In the disclosure, when the mobile robot device 10 is performing rough matching, the RANSAC algorithm which is based on a rigid transformation may be utilized. The rigid transformation refers to a transformation of changing only the position and direction while simultaneously maintaining the shape and size of the subject to be transformed.

In an embodiment, the RANSAC algorithm may be an algorithm which allows values deviating from normal distribution designated as an outlier to be regression analyzed as data (inlier) belonging to normal distribution. Specifically, the mobile robot device 10 may select a predetermined number from among the several accumulated feature points, and obtain a regression model after assuming the feature point by the selected predetermined number as data (inlier) belonging to normal distribution. Then, the mobile robot device 10 may identify whether the remaining feature points are within a predetermined allowable error range when comparing the remaining feature points with the regression model, and include the feature points as data (inlier) within normal distribution based on the feature points being within allowable error range and constructing the regression model again. Then, the mobile robot device 10 may measure the error between the reconstructed regression model and the data (inlier) which belong in the normal distribution, and based on whether or not the error exceeds an allowable error range, identify whether or not to repeat the above-described process.

The second step may be a step in which the mobile robot device 10 may obtain the key node most proximate with the target node from among the submap by matching the node included with the feature point which is accumulated in the submap searched in the first step and the target node.

That is, the first step may be the step in which the mobile robot device 10 may view the submap applied with the RANSAC algorithm as one and search for the most proximate submap by matching with the target node, and the second step may be the step in which the mobile robot device 10 may obtain the key node which is the most proximate node with the target node by matching the node included with the feature point of the searched submap and the target node.

After performing the above-described node management 430, the mobile robot device 10 may generate the depth-based constraint 450 and the feature-based constraint 460 of each of the key nodes The mobile robot device 10 may generate a constraint by connecting an area in which depth data of the key node matches with depth data of the target node and the constraint may be referred to as depth-based constraints 450.

The mobile robot device 10 may generate a constraint by connecting an area in which the feature of the key node matches the feature of the target node and the constraint may be referred to as feature-based constraint 460.

The mobile robot device 10 may generate and optimize a graph structure 470 of a loop closing form by generating depth-based constraints 450 and feature-based constraints 460 based on the key node. The optimizing the graph structure may refer to the mobile robot device 10 accurately generating the graph based on the key node and maximally reducing error in order to best represent the position information of the mobile robot device 10.

A bag of words (BOW) scene matching 440 may be a matching method which may be used by the mobile robot device 10 in situations such as kidnapping. In an embodiment, when the wheel sensor 160 detects a kidnapping situation, the mobile robot device 10 may extract a representative feature point from among the feature points extracted from the previously obtained image data, and generate a codebook comprised on the representative feature point. Then, the mobile robot device 10 may, when placed on the floor after the kidnapping situation, check whether a current position matches a previously placed position by using the codebook.

Figure 5:
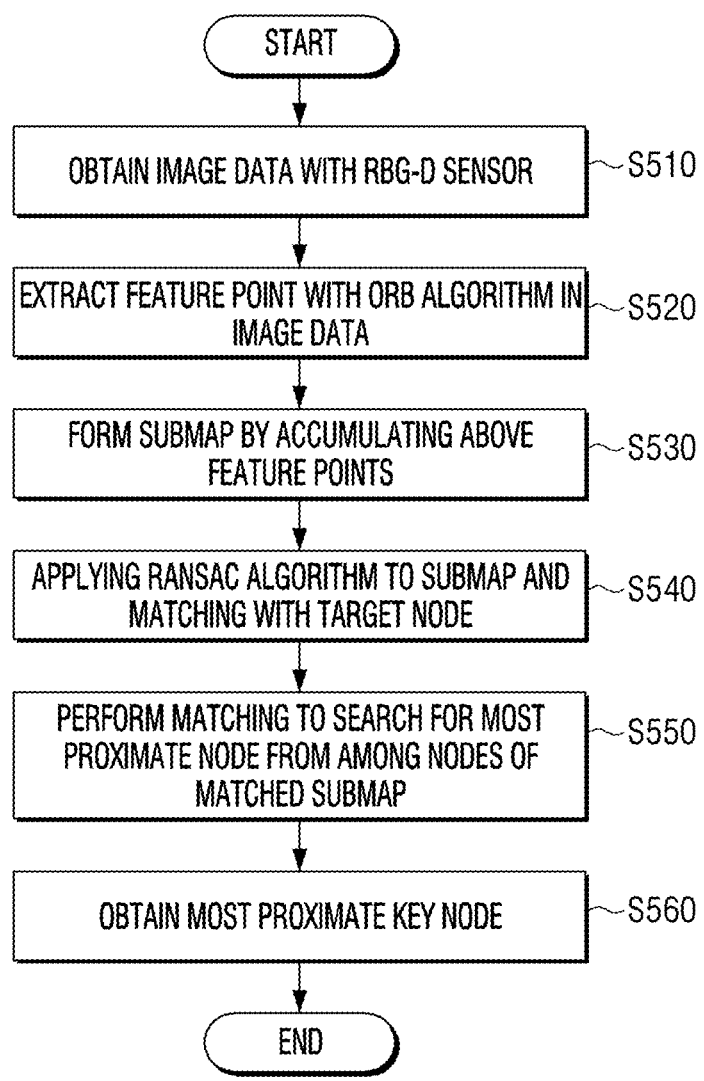
FIG. 5 is a flowchart illustrating a method of obtaining a key node from an image sensor according to an embodiment of the disclosure.

FIG. 5 is a flowchart illustrating a method of obtaining a key node from the image sensor 110 according to an embodiment of the disclosure.

In an embodiment, the image sensor 110 such as an RGB-D sensor may obtain the 3-dimensional image data (S510). The mobile robot device 10 may store the obtained 3-dimensional image data in the memory 130.

Then, the mobile robot device 10 may extract the feature point by applying, for example, the Oriented FAST and Rotated BRIEF (ORB) algorithm in the plurality image data stored in the memory 130 (S520).

Then, the mobile robot device 10 may form a submap by accumulating the extracted feature points (S530), and apply the RANSAC algorithm and perform matching (S540). The above-described method of matching may be divided into two steps as described above.

The first step may be a step in which the mobile robot device 10 views the submap to which RANSAC algorithm has been performed as one node and performs rough matching with the target node.

The second step may be a step in which the mobile robot device 10 searches for the most proximate node by matching the node of the matched submap and the target node (S550). Thereafter, the mobile robot device 10 may obtain the node most proximate to the target node, that is the key node (S560).

Figure 6A:
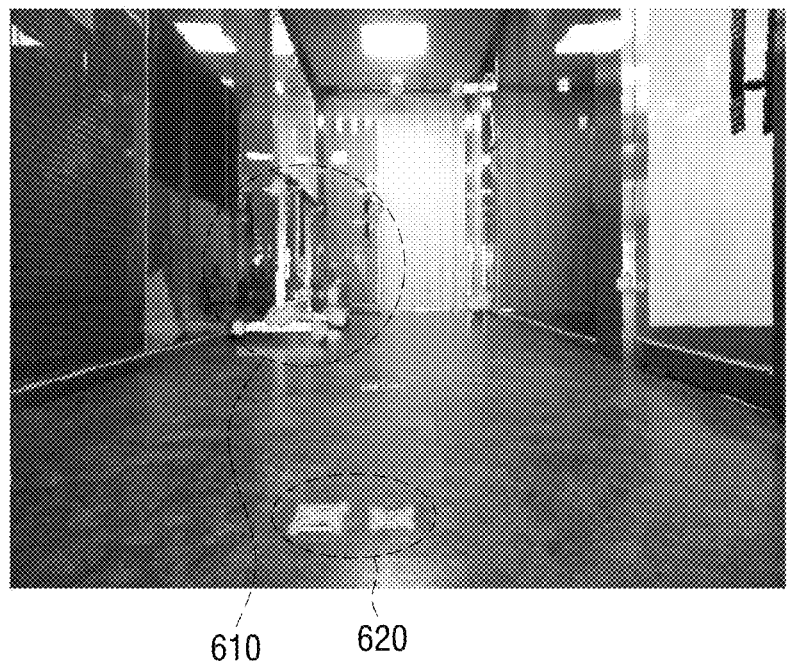
FIG. 6A is a diagram illustrating a method of extracting a feature point from an image data according to an embodiment of the disclosure.
Figure 6B:
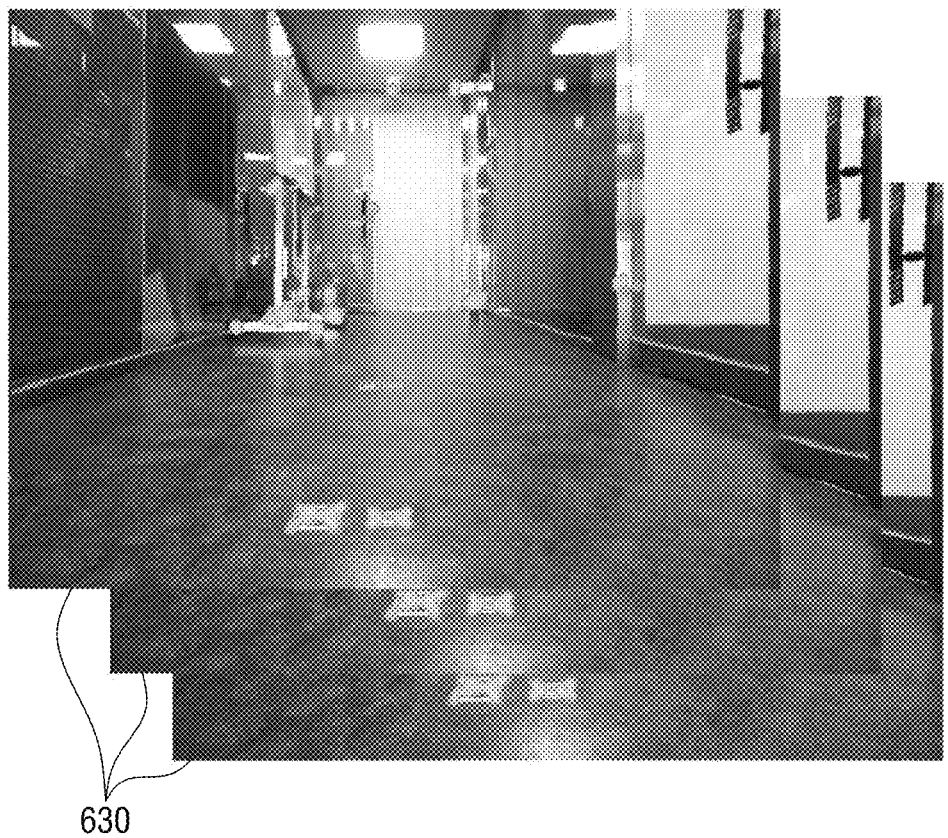
FIG. 6B is a diagram illustrating a submap which accumulated feature points extracted from an image data according to an embodiment of the disclosure.

FIGS. 6A and 6B are diagrams illustrating a method of extracting a feature point from an image data according to an embodiment of the disclosure.

FIG. 6A illustrates an image of the mobile robot device 10 extracting a feature point from a 3-dimensional image data. The mobile robot device 10 may view a leg vicinity 610 of a white board which is consecutively brighter than a pixel of a floor vicinity of a hallway as a feature point and extract the feature point. At the same time, the mobile robot device 10 may view a portion 620 to which a white tape is attached which is consecutively brighter than the pixel of the floor vicinity of the hallway as the feature point and extract the feature point.

FIG. 6B illustrates accumulating the extracted feature points as a submap in the 3-dimensional image data through the mobile robot device 10. As described above, the mobile robot device 10 may apply the RANSAC algorithm to the submap comprised by accumulating the feature points extracted from the image data and matching with the target node. The mobile robot device 10 may then obtain the key node by matching the feature point comprising the matched submap and the target node.

Figure 7:
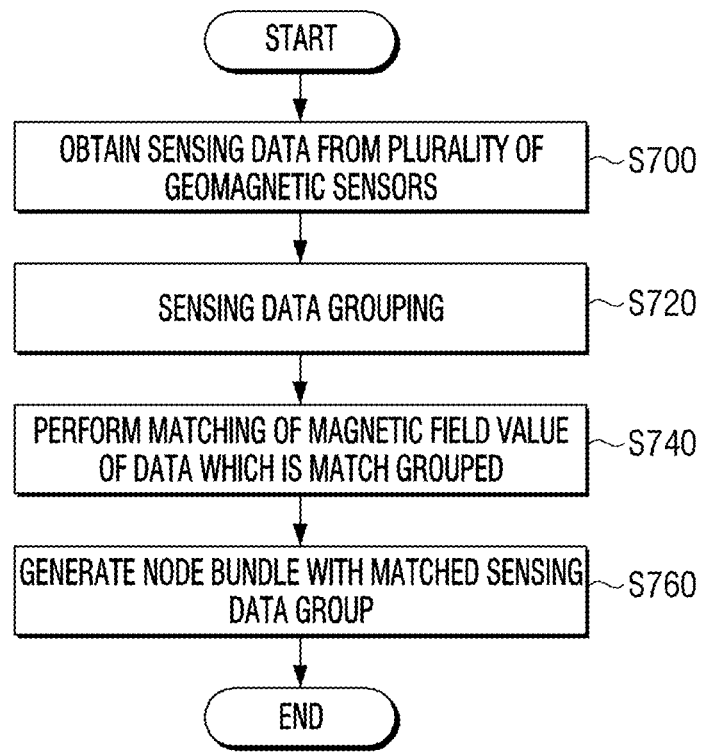
FIG. 7 is a flowchart illustrating a method of obtaining a node bundle from sensing data according to an embodiment of the disclosure.

FIG. 7 is a flowchart illustrating a method of obtaining a node bundle from sensing data according to an embodiment of the disclosure.

First, sensing data may be obtained in the plurality of geomagnetic sensors 120 (S700). The sensing data may be data which estimates distortion in magnetic field in an indoor environment, and because the sensing data must be comprised in sequence form, the mobile robot device 10 may perform grouping of the sensing data in the sequence form (S720).

The mobile robot device 10 may compare and match the magnetic field values of the previously stored sensing data group and the newly obtained sensing data group (S740). The mobile robot device 10 may, by comparing and matching the magnetic field values of the sensing data group, form a loop closing with the node sequence as an element.

$$\text{Cost} = \|p - q\|_2 \tag{2}$$

The above equation (2) may be an equation calculating a matching cost when the sensing data group is represented as a vector. The mobile robot device 10 may obtain the matching cost by calculating a Euclidean distance of the previously stored sensing data group and the newly obtained sensing data.

The mobile robot device 10 may generate a node bundle with the matched sensing data group (S760). That is, the mobile robot device 10 may generate a node bundle comprised of a pair of graph structures with the matched sensing data group.

Figure 8:
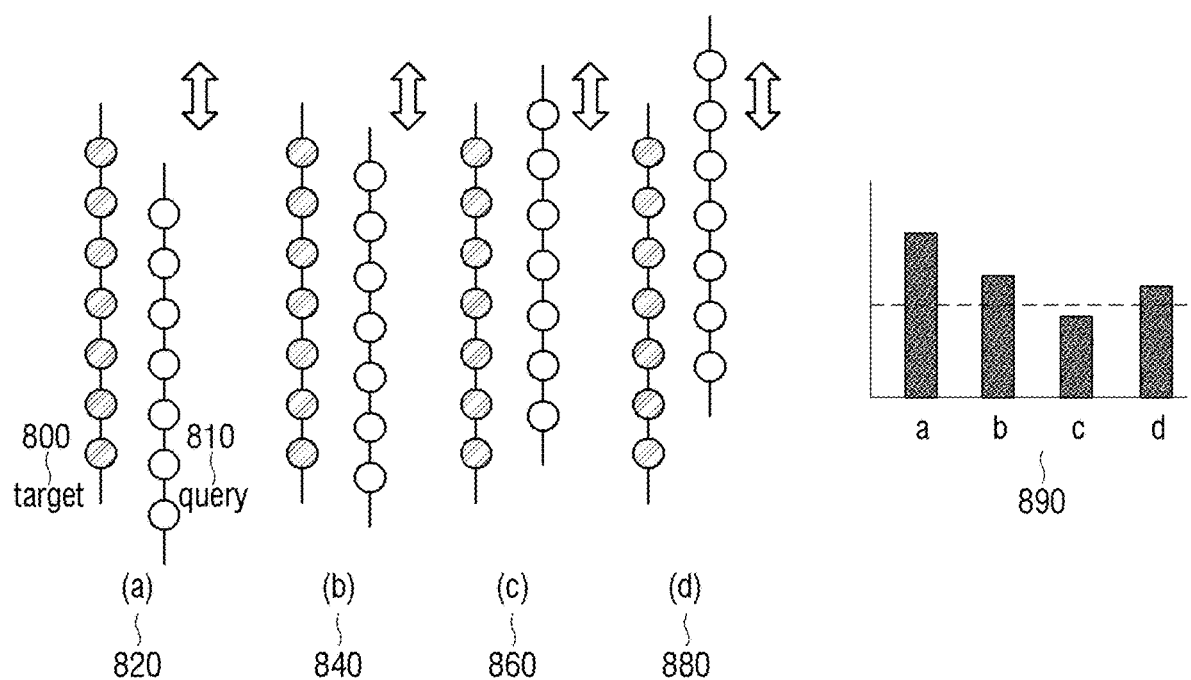
FIG. 8 is a diagram illustrating a method of obtaining a node sequence by matching a node bundle according to an embodiment of the disclosure.
Figure 9A:
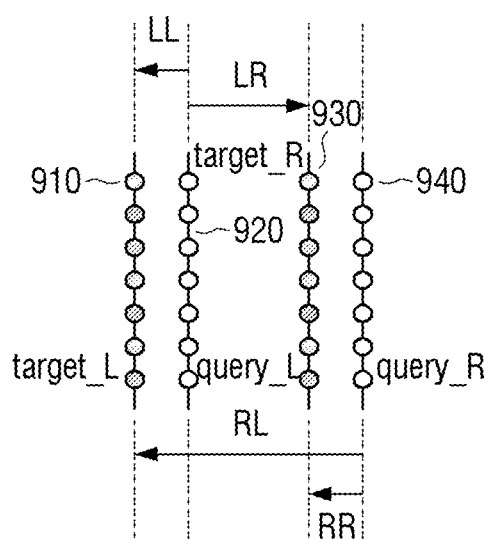
FIG. 9A is a diagram illustrating a distance value of a previously obtained node bundle and a newly obtained node bundle according to an embodiment of the disclosure.
Figure 10:
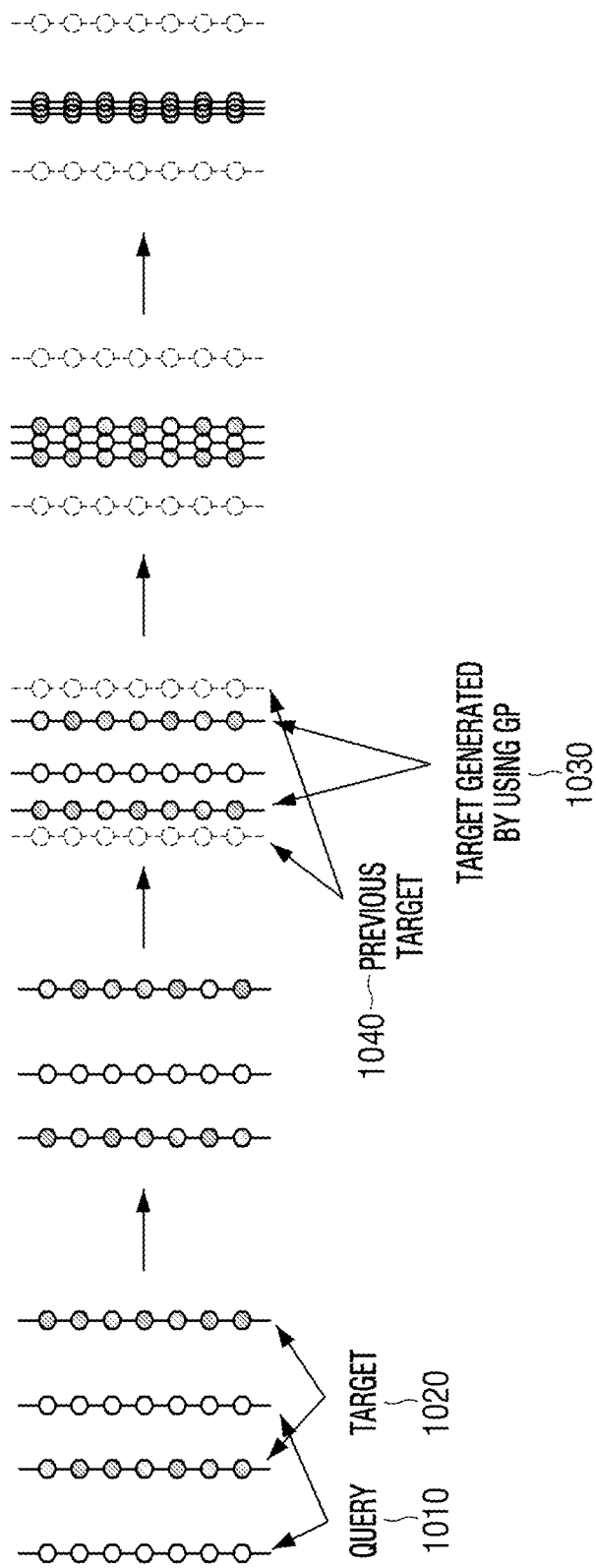
FIG. 10 is a diagram illustrating a method of locating a position of a newly obtained node bundle by using a previously obtained node bundle according to an embodiment of the disclosure.

FIGS. 8 to 10 are diagrams illustrating a method of obtaining a node sequence by matching a node bundle according to an embodiment of the disclosure.

FIG. 8 illustrates a process in which the mobile robot device 10 searches for a matching point while comparing a distance difference of a previously obtained node bundle 800 (or, target) and a newly obtained node bundle 810 (or, query).

The mobile robot device 10 may calculate an error score while pushing the query 810 and leaving the target 800. The mobile robot device 10 may repeat the process 820 of continuously raising the position of the query 810 upwards and seeking a distance difference with the target 800. Accordingly, rather than in the case of (b) 840 or (d) 880 in FIG. 8, it may be known that (c) shows the smallest the distance difference between the target 800 and the query 810 through a table 890.

FIG. 9A illustrates a node bundle comprised of graph structure of the pair, target_L 910 and target_R 930 and a node bundle comprised of graph structure of the pair, query_L 920 and query_R 940.

FIG. 9B illustrates whether or not the mobile robot device 10 is within a range in which a physical value between each node bundle may be measured because the target 800 is present between the query 810 in table form.

As illustrated in FIG. 9A, the mobile robot device 10 may calculate the distance difference of target_L 910 and target_R 930 based on query_L 920 and query_R 940. For example, the mobile robot device 10 may calculate the distance with target_L 920 as LL based on query_L 920, and calculate the distance with query_L 920 and target_R 930 as LR.

As illustrated in FIG. 9B, the mobile robot device 10 may measure the distance difference between the graph structures which comprise the query bundle and the target bundle only when the query bundle is present between the target bundle be it the left side or the right side.

FIG. 10 illustrates a process of the target 1020 extracting only the query based on the mobile robot device 10 identifying that the query 1010 is present between the target 1020, and the error score updating the smaller target 1030 by using the Gaussian process in order to locate the position of the extracted query 1010.

The mobile robot device 10 may extract only the query present between the target 1020 and select the extracted query as the node sequence. Then, the mobile robot device 10 may generate the target with the smaller distance difference with the query than the previous target 1040 by using the Gaussian process to locate the position of the node sequence.

The mobile robot device 10 may finally locate the position of the node sequence by repeatedly performing the Gaussian process until the distance difference with the query selected as the node sequence is nearly non-existent, that is until the distance different is to a minimum.

Figure 11:
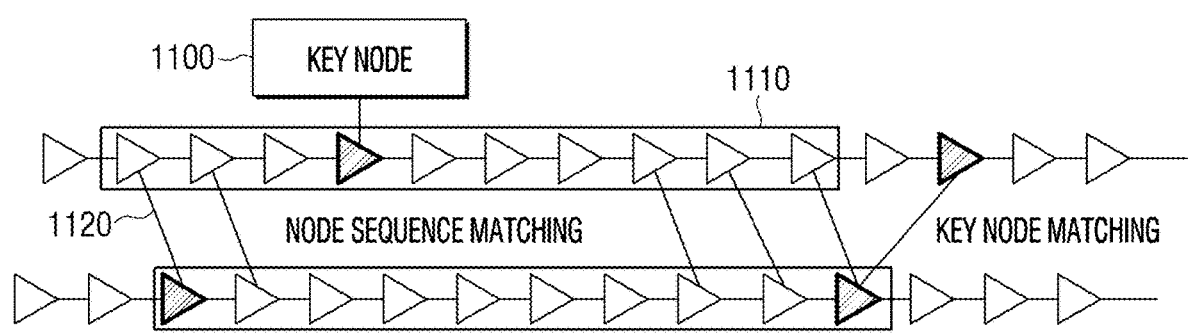
FIG. 11 is a diagram illustrating a method of generating a graph structure by using a key node and a node sequence according to an embodiment of the disclosure.

FIG. 11 is a diagram illustrating a method of generating the graph structure by using the key node and the node sequence according to an embodiment of the disclosure.

The mobile robot device 10 may perform simultaneous matching by constructing a graph structure 1110 with the obtained node sequence as an element based on the key node 1100 and sensing data obtained based on the 3-dimensional image data.

Specifically, the mobile robot device 10 may create a constraint 1120 by using the key node 1100 and the node sequence, and perform a graph SLAM by generating a graph structure in a loop closing form.

Figure 12A:
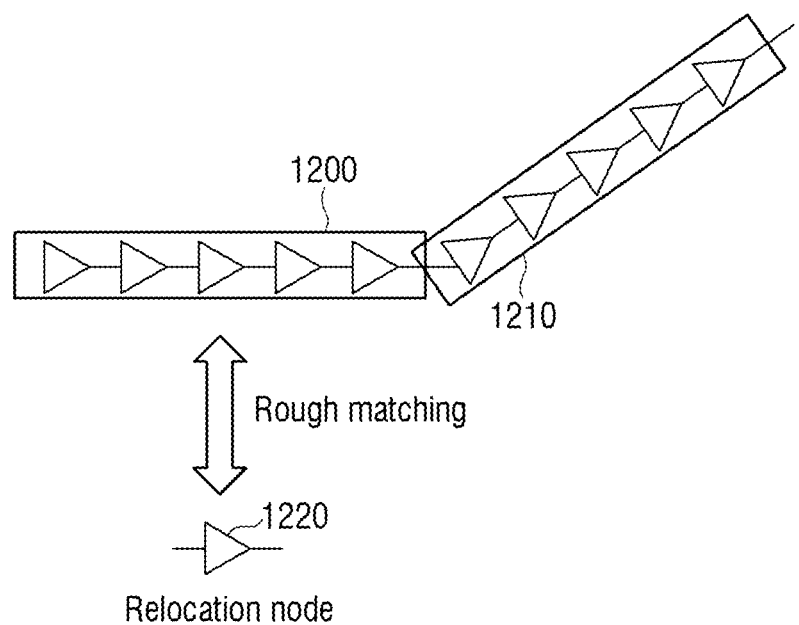
FIG. 12A is a diagram illustrating a method of matching a submap and a target node based on a mobile robot device failing in position recognition according to an embodiment of the disclosure.
Figure 12B:
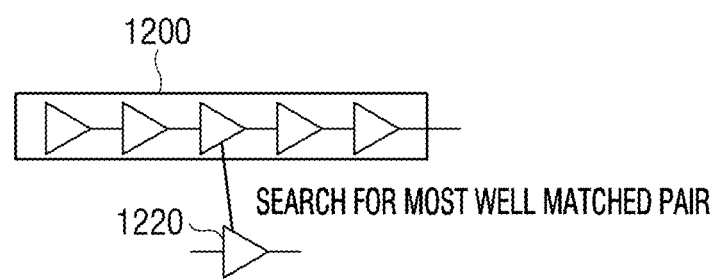
FIG. 12B is a diagram illustrating a method of matching a feature point of a submap and a target node based on a mobile robot device failing in position recognition according to an embodiment of the disclosure.
Figure 13A:
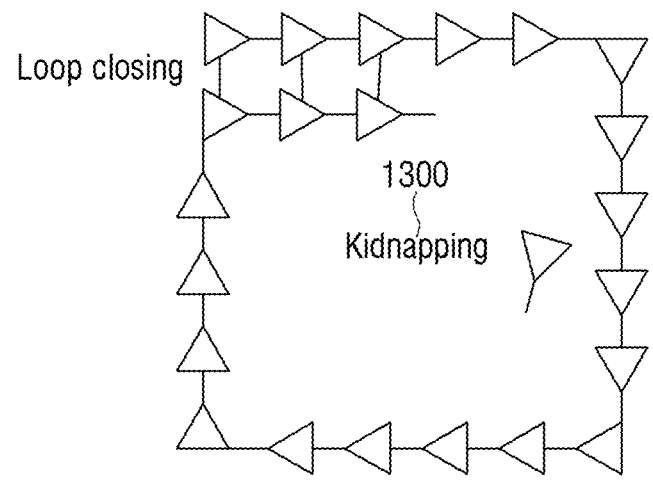
FIG. 13A is a diagram illustrating a method of matching with a target node based on a mobile robot device failing in position recognition according to an embodiment of the disclosure.
Figure 13B:
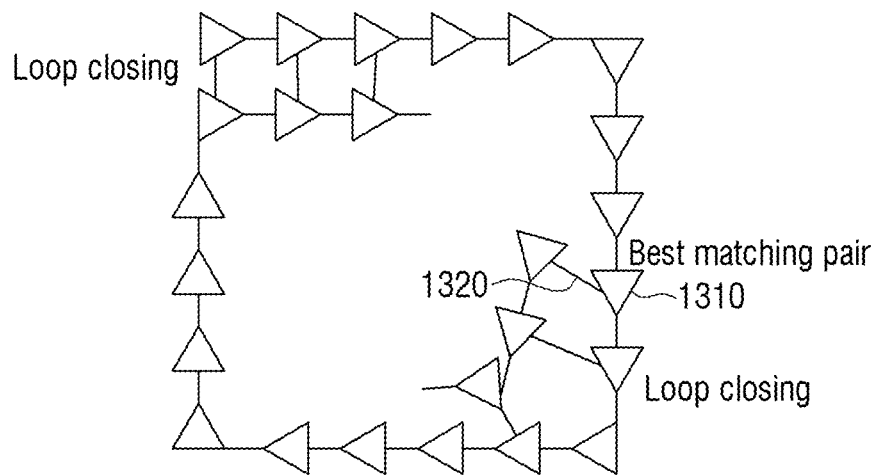
FIG. 13B is a diagram illustrating a method of correcting a graph by matching with a target node based on a mobile robot device failing in position recognition according to an embodiment of the disclosure.
Figure 14:
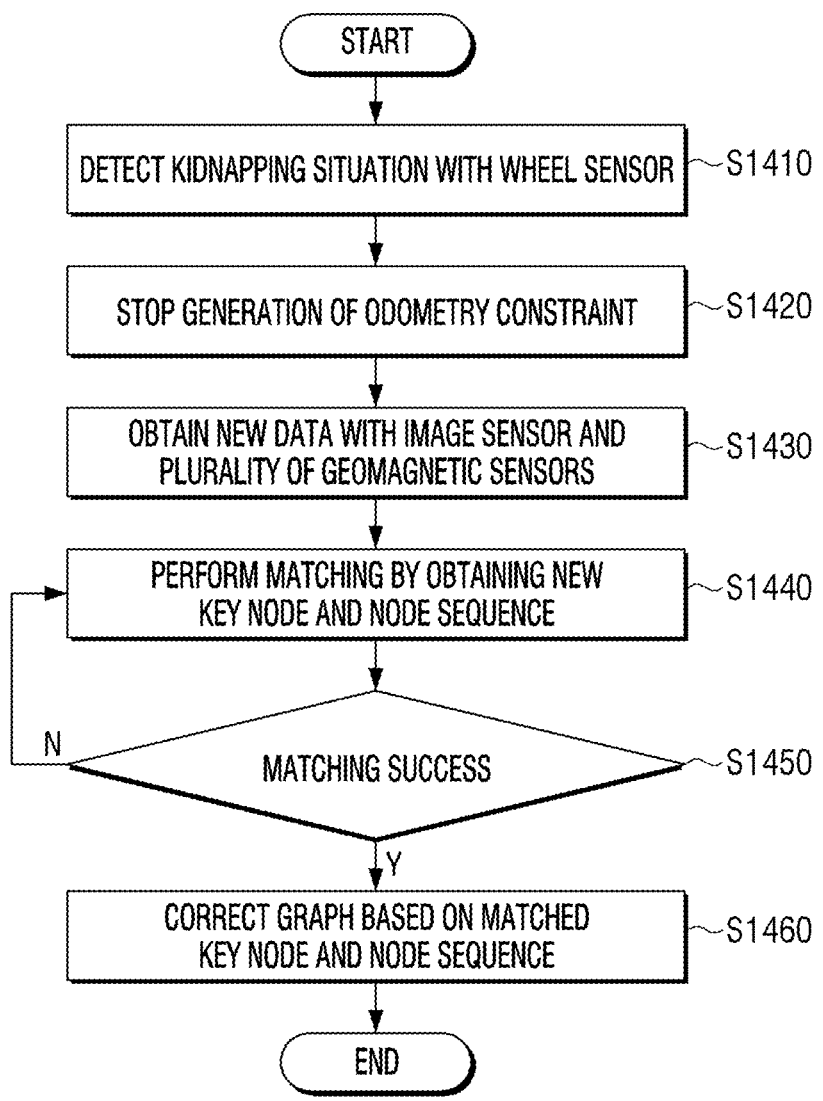
FIG. 14 is a flowchart illustrating a method of matching with a target node based on a mobile robot device failing in position recognition according to an embodiment of the disclosure.

FIGS. 12 to 13 are diagrams illustrating a method of correcting the graph based on the mobile robot device 10 failing in position recognition according to an embodiment of the disclosure, and FIG. 14 is a flowchart illustrating a method of correcting the graph based on the mobile robot device 10 failing in position recognition according to an embodiment of the disclosure.

The wheel sensor 160 may detect a situation in which the mobile robot device 10 fails in position recognition such as a kidnapping situation where the mobile robot device 10 is lifted, or the like, and the mobile robot device 10 may obtain the key node and the node sequence by using the image sensor 110 and the plurality of geomagnetic sensors 120 again.

The mobile robot device 10 may perform rough matching with the relocation node 1220 based on the submap with features accumulated as in a situation identical to a kidnapping situation.

As illustrated in FIG. 12A, the mobile robot device 10 may perform matching with the submap 1200 included with the node which is relatively more proximate with the relocation node 1220 from among the several submaps. The mobile robot device 10 may then identify the submap 1210 included with the node which is relatively further located as not matching with the relocation node 1220.

As illustrated in FIG. 12B, the mobile robot device 10 may then search for a best matching pair by matching once more with the submap 1200 including the node which is more proximate with the relocation node 1220.

FIG. 13 illustrates in detail a process of the mobile robot device 10 searching for the best matching pair, that is the node, in a kidnapping 1300 situation in the loop closing graph structure.

Based on the mobile robot device 10 locating the best matching node 1310, the mobile robot device 10 may place a constraint 1320 to the best matching node 1310 and perform the previous graph SLAM.

FIG. 14 is a flowchart illustrating a method of correcting the graph based on the mobile robot device 10 failing in position recognition according to an embodiment of the disclosure.

First, the wheel sensor 160 may detect a kidnapping situation such as the mobile robot device 10 being lifted or the like (S1410). The mobile robot device 10 may stop the generation of the odometry constraint (S1420). Accordingly, the mobile robot device 10 may newly obtain the 3-dimensional image data and sensing data by using the image sensor 110 and the plurality of geomagnetic sensors 120 while at the same time rotating (S1430).

Then, the mobile robot device 10 may newly obtain the key node and the node sequence based on the obtained new 3-dimensional image data and the sensing data, and attempt matching with the relocation node (S1440).

The mobile robot device 10 may identify the next step based on whether or not matching was successful (S1450). The mobile robot device 10 may attempt matching again if matching was not successful (S1440), and correct the graph based on the matched key node and node sequence if matching was successful (S1460).

FIG. 15 is a diagram illustrating a method and a result of testing by assuming that the mobile robot device 10 failed in position recognition according to an embodiment of the disclosure.

Figure 15A:
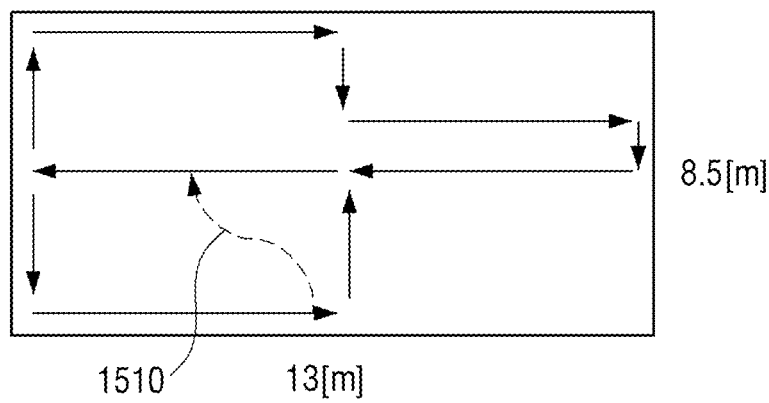
FIG. 15A is a diagram illustrating a method of testing by assuming that a mobile robot device failed in position recognition according to an embodiment of the disclosure.

FIG. 15A illustrates a testing method to discover how the mobile robot device may operate when a kidnapping situation 1510 is arbitrarily generated to the mobile robot device 10 by the tester in a 13 m wide and 8.5 m long rectangular testing area.

Figure 15B:
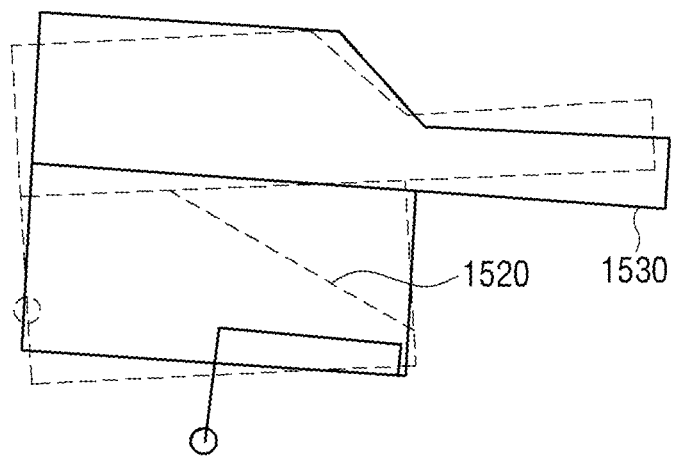
FIG. 15B is a diagram illustrating a result of testing assuming a case of a mobile robot device failing in position recognition according to an embodiment of the disclosure.

FIG. 15B illustrates a result value of when the test planned in FIG. 15A has actually been executed. The line represented in dotted line 1520 shows the trajectory of the graph SLAM generated by the mobile robot device 10 in a kidnapping situation. The line represented in solid line 1530 may be an odometry trajectory of the mobile robot device 10, and it can be known that the result value may be derived to match the trajectory 1520 of the graph SLAM even if a kidnapping 1510 situation occurs.

Figure 16:
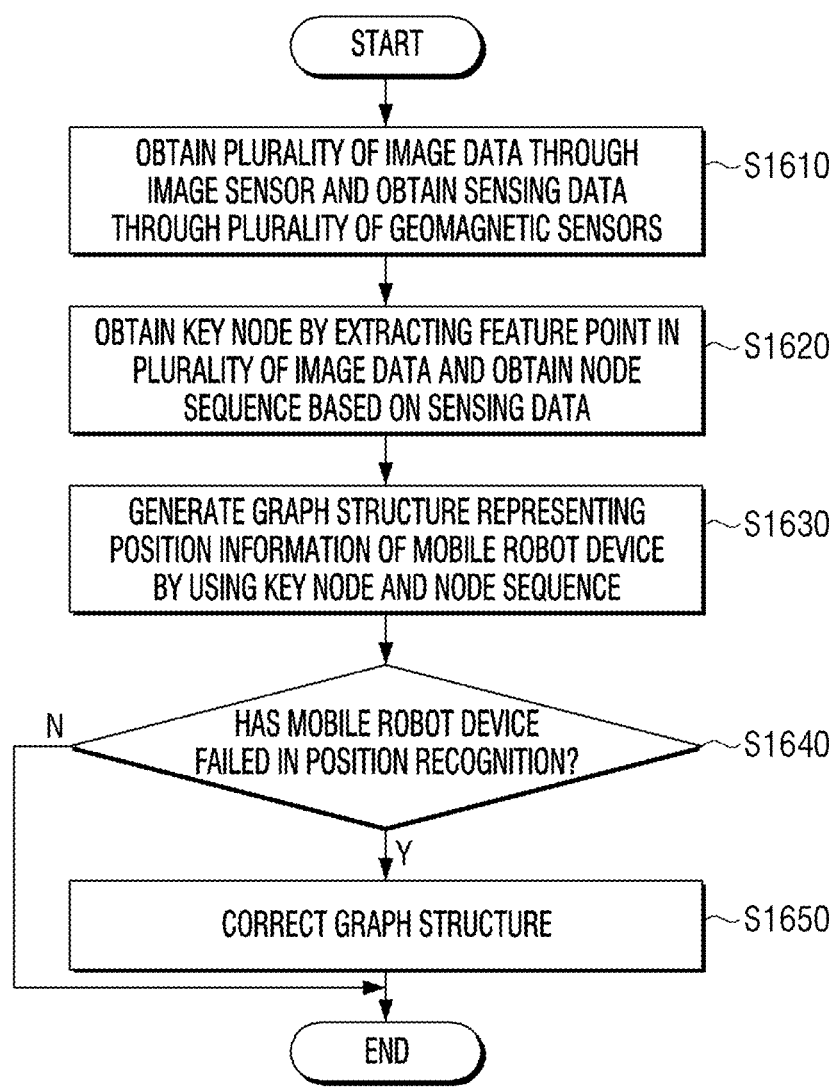
FIG. 16 is a flowchart illustrating a method of controlling a mobile robot device according to an embodiment of the disclosure.

FIG. 16 is a flowchart illustrating a control method of the mobile robot device 10 according to an embodiment of the disclosure.

First, the mobile robot device 10 may obtain the plurality of image data through the image sensor 110 and obtain the sensing data through the plurality of geomagnetic sensors 120 (S1610).

Then, the mobile robot device 10 may obtain they key node by extracting the feature point from the plurality of image data, and obtain the node sequence based on the sensing data (S1620).

Then, the mobile robot device 10 may generate the graph structure representing the position information of the mobile robot device 10 by using the obtained key node and the node sequence (S1630).

Then, the mobile robot device 10 may, based on failing in position recognition (e.g., situation such as kidnapping) (S1640), correct the graph structure representing the position information of the mobile robot device by newly obtaining the key node and the node sequence (S1650).

The terms "part" or "module" used in the disclosure may include a unit configured as a hardware, software, or firmware, and may be used interchangeably with terms such as, for example, and without limitation, logic, logic blocks, parts, circuits, or the like. "Part" or "module" may be a part integrally formed or a minimum unit or a part of the part performing one or more functions. For example, a module may be configured to the form of an application-specific integrated circuit (ASIC).

The various embodiments described above may be implemented as a software including instructions stored on a machine-readable storage media readable by a machine (e.g., computer). The machine, as a device capable of calling an instruction stored in a storage medium and operating according to the called instruction, may include an electronic device according to the disclosed embodiments. Based on instructions being executed by the processor, the processor may directly, or using other elements under the control of the processor, perform a function corresponding to the instruction. The instruction may include a code generated by a compiler or a code executable by an interpreter. The machine-readable storage medium may be provided in the form of a non-transitory storage medium. Here, the 'non-transitory storage medium' may not include a signal and is tangible, but does not distinguish data being semi-permanently or temporarily stored in a storage medium.

According to an embodiment, the method according to various embodiments disclosed herein may be provided in a computer program product. The computer program product may be exchanged between a seller and a purchaser as a commodity. The computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be at least temporarily stored in a storage medium such as a server of a manufacturer, a server of an application store, or a memory of a relay server, or temporarily generated.

Each of the elements (e.g., a module or a program) according to the various embodiments described above may be composed of a single entity or a plurality of entities, and some sub-elements of the abovementioned sub-elements may be omitted, or another sub-element may be further included in the various embodiments. Alternatively or additionally, some elements (e.g., modules or programs) may be integrated into one entity to perform the same or similar functions performed by each respective element prior to integration. The operations performed by a module, a program, or other element, in accordance with the various embodiments, may be performed sequentially, in a parallel, repetitively, or in a heuristically manner, or at least some operations may be performed in a different order, omitted, or may further include a different operation.

What is claimed is:

1. A mobile robot device, comprising:
a driving unit;
an image sensor;
a plurality of geomagnetic sensors;
a memory storing at least one instruction; and
a processor configured to execute the at least one instruction,
wherein the processor is configured to:
obtain, while the mobile robot device moves through the driving unit, a plurality of image data through the image sensor and obtain sensing data through the plurality of geomagnetic sensors,
extract a feature point from the plurality of image data and obtain key nodes based on the feature point,
obtain a node sequence based on the sensing data,
generate a graph structure estimating a position of the mobile robot device based on the key nodes and the node sequence,
recognize a position of the mobile robot device based on the generated graph structure;
based on failing in position recognition of the mobile robot device, stop generating the graph structure that estimates the position based on the key nodes and the node sequence;
obtain new image data from the image sensor;
obtain new sensing data through the plurality of geomagnetic sensors;
obtain a new key node corresponding to the new image data and a new node sequence corresponding to the new sensing data; and
correct the graph structure based on the new sensing data and the new node sequence.

2. The mobile robot device of claim 1, wherein the processor is configured to extract a plurality of feature points by using an Oriented FAST and Rotated BRIEF (ORB) algorithm in the plurality of image data.

3. The mobile robot device of claim 1, wherein the processor is configured to:
form a submap by accumulating the feature points; and
obtain the key nodes by performing a Random Sample Consensus (RANSAC) algorithm on the submap and matching with the most proximate node.

4. The mobile robot device of claim 1, wherein the processor is configured to:
obtain a sensing data group by grouping the obtained sensing data;
perform matching by comparing a magnetic field value of the sensing data group with magnetic field values of the previously stored sensing data group; and
obtain a node bundle comprised of a pair of graph structures based on the matched sensing data group.

5. The mobile robot device of claim 1, wherein the processor is configured to:
identify whether or not a newly obtained node bundle is present between a previously stored node bundle;
based on the newly obtained node bundle being identified as present between the previously stored node bundle, extract only the newly obtained node bundle present between the previously obtained node bundle; and
select only the extracted newly obtained node bundle as the node sequence.

6. The mobile robot device of claim 5, wherein the processor is configured to:
update the previously obtained node bundle with a smaller distance difference with the extracted newly obtained node bundle;
search for a node bundle with the smallest distance difference from among the extracted newly obtained node bundle and the updated previously obtained node bundle; and
locate a position of the node sequence by using the node bundle with smallest distance difference.

7. The mobile robot device of claim 6, wherein the processor is configured to update to a previously obtained node bundle with a smaller distance difference by using a Gaussian process.

8. A control method of a mobile robot device, comprising:
while the mobile robot device is moving, obtaining a plurality of image data through an image sensor and obtaining sensing data through a plurality of geomagnetic sensors;

extracting a feature point from the plurality of image data and obtaining key nodes based on the feature point;

obtaining a node sequence based on the sensing data;

generating a graph structure which estimates a position of the mobile robot device based on the key nodes and the node sequence;

recognizing a position of the mobile robot device based on the generated graph structure;

based on failing in position recognition of the mobile robot device, stop generating the graph structure that estimates the position based on the key nodes and the node sequence;

obtaining new image data from the image sensor;

obtaining new sensing data through the plurality of geomagnetic sensors;

obtaining a new key node corresponding to the new image data and a new node sequence corresponding to the new sensing data; and correcting the graph structure based on the new sensing data and the new node sequence.

9. The method of claim 8, wherein the obtaining the key nodes comprises extracting a plurality of feature points by using an Oriented FAST and Rotated BRIEF (ORB) algorithm in the plurality of image data.

10. The method of claim 8, wherein the obtaining the key nodes comprises:

forming a submap by accumulating the feature points; and performing a Random Sample Consensus (RANSAC) algorithm on the submap and obtaining the key node by matching with a most proximate node.

11. The method of claim 8, wherein the obtaining the node sequence comprises:

obtaining a sensing data group by grouping the obtained sensing data;

matching by comparing a magnetic field value of the sensing data group with magnetic field values of a previously stored sensing data group; and obtaining a node bundle comprised of a pair of graph structures based on the matched sensing data group.

12. The method of claim 11, wherein the obtaining the node sequence comprises:

identifying whether or not a newly obtained node bundle is present between a previously stored node bundle;

based on identifying that the newly obtained node bundle is present between the previously stored node bundle, extracting only the newly obtained node bundle that is present between the previously obtained node bundle; and selecting only the extracted newly obtained node bundle as the node sequence.

* * * * *